(12) United States Patent
Gustin

(10) Patent No.: US 10,629,051 B2
(45) Date of Patent: Apr. 21, 2020

(54) DOORWAY ENTRY SENTRY AUTO CALLER

(71) Applicant: Thomas Gustin, Xenia, OH (US)

(72) Inventor: Thomas Gustin, Xenia, OH (US)

( * ) Notice: Subject to any disclaimer, the term of this patent is extended or adjusted under 35 U.S.C. 154(b) by 0 days.

(21) Appl. No.: 15/822,064

(22) Filed: Nov. 24, 2017

(65) Prior Publication Data

US 2019/0130726 A1  May 2, 2019

Related U.S. Application Data

(60) Provisional application No. 62/576,064, filed on Oct. 23, 2017.

(51) Int. Cl.
| | | |
|---|---|---|
| *A61B 5/0245* | (2006.01) | |
| *G08B 21/04* | (2006.01) | |
| *H04B 11/00* | (2006.01) | |
| *A61G 5/10* | (2006.01) | |
| *G08B 25/10* | (2006.01) | |
| *G08B 25/08* | (2006.01) | |

(52) U.S. Cl.
CPC .......... *G08B 21/0461* (2013.01); *A61G 5/10* (2013.01); *G08B 25/08* (2013.01); *G08B 25/10* (2013.01); *H04B 11/00* (2013.01)

(58) Field of Classification Search
CPC .... G08B 21/0461; G08B 25/08; G08B 25/10; A61G 5/10; H04B 11/00
See application file for complete search history.

(56) References Cited

U.S. PATENT DOCUMENTS

2006/0286960 A1\* 12/2006 Goehler ............... A61B 5/0002
  455/403
2016/0323543 A1\* 11/2016 Yamamoto ............. H04N 7/147

\* cited by examiner

*Primary Examiner* — Munear T Akki
(74) *Attorney, Agent, or Firm* — KSIP; Kelsey Stout

(57) ABSTRACT

DESAC is an after-market supplemental wireless (battery-operated, non-contact, radio-linked) pair of transmitter-receiver sensing modules designed to significantly enhance the safety of many wheelchair-bound semi-mobile residents prone to falling while transferring without assistance, many with varying degrees of dementia, in Skilled-Care, Nursing, Rehabilitation, CCRC, Assisted-Living, Memory-Care, and other forms of Senior Living Facilities (including private homes). It works as an automatic trigger of a standard hospital CALL button that works with any standard ¼ inch plug, normally open, Push-to-Close, mechanical-contact (fully isolated, non-electronic) call-box jacks. Functionally, it appears as though the resident physically pushed their bedside, cabled call button for a constant 10 seconds.

15 Claims, 17 Drawing Sheets

DOORWAY ENTRY SENTRY AUTO CALLER

CLAIM OF PRIORITY BENEFIT

This application claims the benefit under 35 U.S.C. 119 of USPTO Provisional Application No. 62/576,064, filed 23 Oct. 2017.

FIELD OF THE INVENTION

The invention relates a device and method used for doorway emergency sensor for mobility-impaired patients. More specifically, it discloses an apparatus, system and method for detecting a potential fall emergency, discriminating false positives and providing context-dependent emergency call responses.

BACKGROUND INFORMATION

The Doorway Entry-Sentry Auto-Caller ("DESAC") system of devices and methods is designed to solve several issues that are becoming growing problems in various Senior Living Facilities.

There is a growing population in various kinds of Senior Living Facilities that include semi-mobile residents, like those in wheelchairs, who require one or two person-assists in transferring themselves, who also exhibit varying degrees of forgetfulness and/or dementia. The latter symptom is problematic because it is becoming more prevalent, because the resident often does not remember (or wish) to use their Call Button to call for assistance in transferring themselves, and because they may not even remember that they cannot safely transfer themselves without aid.

The DESAC needs to Automatically Call for Help when the resident demonstrates an intention to attempt to transfer themselves; that is, it should "call for help" before help is actually needed.

There have been some attempts to deal with some of these issues by using different sensing techniques. There are problems with most of them that have slowed or prevented their adoption.

With a threshold pressure switch, often the resident is not able to propel their wheelchair over the bump-threshold-switch due to lack of strength, thereby not activating the switch and subsequently the alarm. They may then attempt to exit the wheelchair unaided, even tripping over this sensor-threshold; usually resulting in a fall.

Wheel-chair seat pads create many false alarms eventually resulting in Alarm Fatigue due to patient repositioning in the wheelchair just for some more comfort. Wheel-chair seat pads only indicate a safety issue after the patient has already started transferring (out of the wheelchair). And, wheel-chair seat pads units that do not insert a Call into the Call system are often unnoticed in closed private rooms, rendering them useless and annoying.

Infrared motion detectors also have many false alarms due to sudden light level changes. An aid is unable to prevent a Call for assistance. If motion is stopped no presence is detected because 'changes' are required. Door strip sensors are generally some form of ferrite antenna. They require the patient to wear a transmitter or transponder, whose performance is significantly degraded or rendered dysfunctional by metal doors, metal-reinforced wood doors, and metal door jams, all common as fire doors in new constructions. A wheelchair-bound resident with dementia may forget to wear the transmitter/transponder, rendering this sensor useless.

Common Call Button products for hospitals or hospices assume that the resident can or will push the button for assistance when needed, including cabled (bedside) buttons, commode-side pull-cords, wristband bracelets and necklace-pendants. Many patients, though, with varying degrees of dementia, are unable to remember to call for assistance, and usually still only remember that they are fully capable of transferring themselves into and out of a (wheel-) chair. Serious injuries, and sometime fatalities, often result from falls that may not have occurred had help arrived in time. The best scenario would be an automatic call for assistance before a transfer is even attempted.

A better system would solve the above problems by having the following features:

Non-contact sensing (no need to roll a wheelchair up and over a threshold bumper switch)

Sensing presence in a narrow beam with distance-discrimination instead of any motion in a wide area and long-distance, one that does NOT require continued motion for proper detection.

Should not require that the resident remember to wear anything that enables proper operation of the sensing system.

Is not affected by sudden ambient light changes (lights being turned on or off).

An aid, such as one escorting the wheel-chaired resident into the washroom being watched, can prevent an automatic call from being made into the call system within a reasonable time of being warned visually and audibly.

The sensor will not continue to send calls for help by continued movement in the area being watched after the initial sensing.

The sensor can be re-armed manually after the resident has left the room whose doorway is being watched.

The sensor will automatically re-arm itself (resume 'watching' and reporting entries) after no presence is detected continuously for a set period of time (assumes room has been vacated).

The sensor will not require the use of a special call system in that it can interface with existing call systems just like any other standard cabled call button.

The sensor will behave just like any other call button. Mechanical normally open 'push-to-close' switch (mechanical relay, for instance)

Very high insulation resistance (no measurable voltages for safety).

Have fixed long-duration contact-closure time (10 seconds for instance) so that Call Systems can (with added software, if desired) discern that an automatic call button has made the call versus a usual manual call button (which is rarely pushed continuously for 10 seconds duration).

Will NOT interfere with the performance of other call buttons in any way, acting as a supplemental device in enhancing fall prevention.

The sensor will use short-range 2.4 GHz ISM radio communications instead of longer range 900 MHz (and others) communications to minimize potential interference with existing Call Systems operations.

The sensor will be able to operate using batteries commonly used already in other wireless devices, like call boxes, to permit lower costs, safety and in-house maintenance.

The sensing system needs to operate as automatically as possible to minimize the additional tasking on attending care staff members, while providing for manual interventions by them as application and needs dictate.

The DESAC provides advanced notification to aids, attendants, and assistants by automatically calling for help, through an existing facility's call system, before the patient actually attempts to perform a transfer from their wheelchair, to a commode, for example. When the wheel-chaired-resident enters through the doorway being 'watched' by the DESAC, and after a brief delay during which entry is confirmed, the transmitting module places a radio-call to the receiving module, which, in turn, 'pushes' a request for assistance automatically into the facility's call system. The DESAC obviates and circumvents many 'issues' prevalent with other safety-sensing techniques (chair/bed/floor mats/pads, magnetic/contact sensors, infrared/motion detectors, broken-light-beam, et.al), by its unique design and utilized technologies.

SUMMARY

DESAC is an after-market supplemental wireless (battery-operated, non-contact, radio-linked) pair of transmitter-receiver sensing modules designed to significantly enhance the safety of many wheelchair-bound semi-mobile residents prone to falling while transferring without assistance, many with varying degrees of dementia, in Skilled-Care, Nursing, Rehabilitation, CCRC, Assisted-Living, Memory-Care, and other forms of Senior Living Facilities (including private homes). It works as an automatic trigger of a standard hospital CALL button that works with any standard ¼ inch plug, normally open, Push-to-Close, mechanical-contact (fully isolated, non-electronic) call-box jacks. Functionally, it appears as though the resident physically pushed their bedside, cabled call button for a constant 10 seconds.

Other methods and structures are described in the detailed description below. This summary does not purport to define the invention. The invention is defined by the claims.

DETAILED DESCRIPTION

Figure 1:
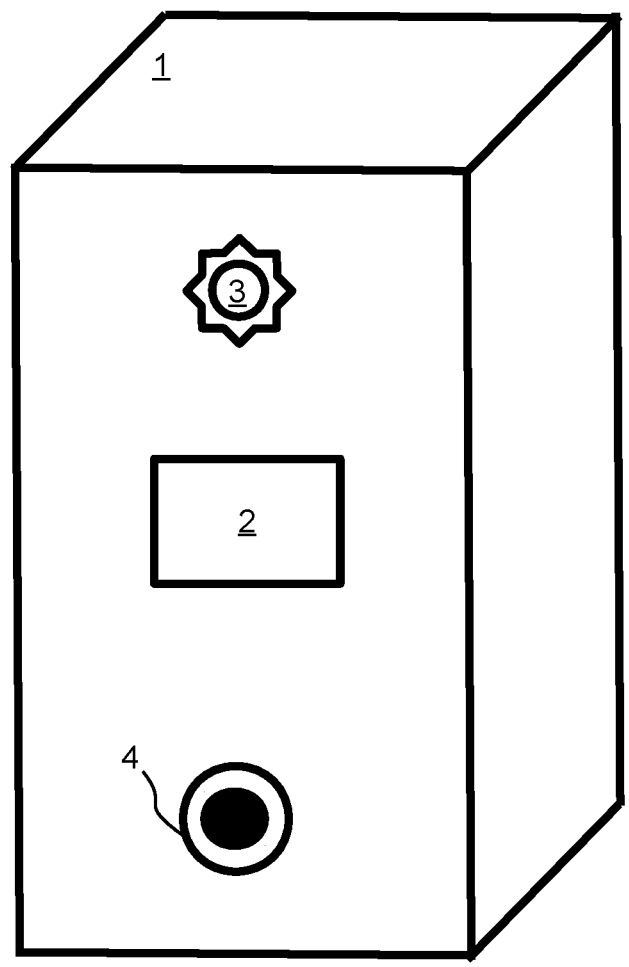
FIG. 1 (PRIOR ART) shows a standard nursing facility emergency call-box.

FIG. 1 (PRIOR ART) shows a standard nursing facility emergency call-box. A standard nursing facility emergency call-box, such as those made by MedCall, ties into the facility's internal room alarm system. An emergency call made by the call-box places an alert to a lightboard or screen indicating the associated room number and remaining until alarm response is made at the call-box.

Reference number 1 indicates the casing of the call-box, with a cancel button 2 and alarm light 3. An emergency sound typically accompanies the alarm light.

A standard quarter-inch jack (¼ inch) allows for the insertion of various emergency call peripherals. These are typically thumb-activated buttons or triggers hanging from thick rubber cables such that they reach a beside. Multiple call trigger peripherals can be attached to one ¼ inch jack with Y-shaped connectors.

Figure 2:
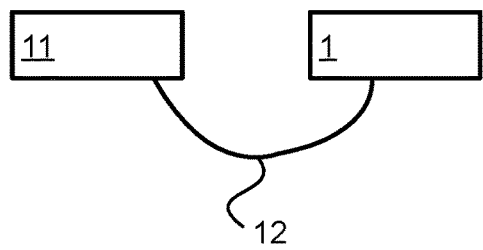
FIG. 2 shows the minimum system of one DESAC Sensor-Transmitter Module watching a doorway 6 and one DESAC Receiver-Caller Module receiving signals from the DESAC Sensor Transmitter Module.
Figure 2:
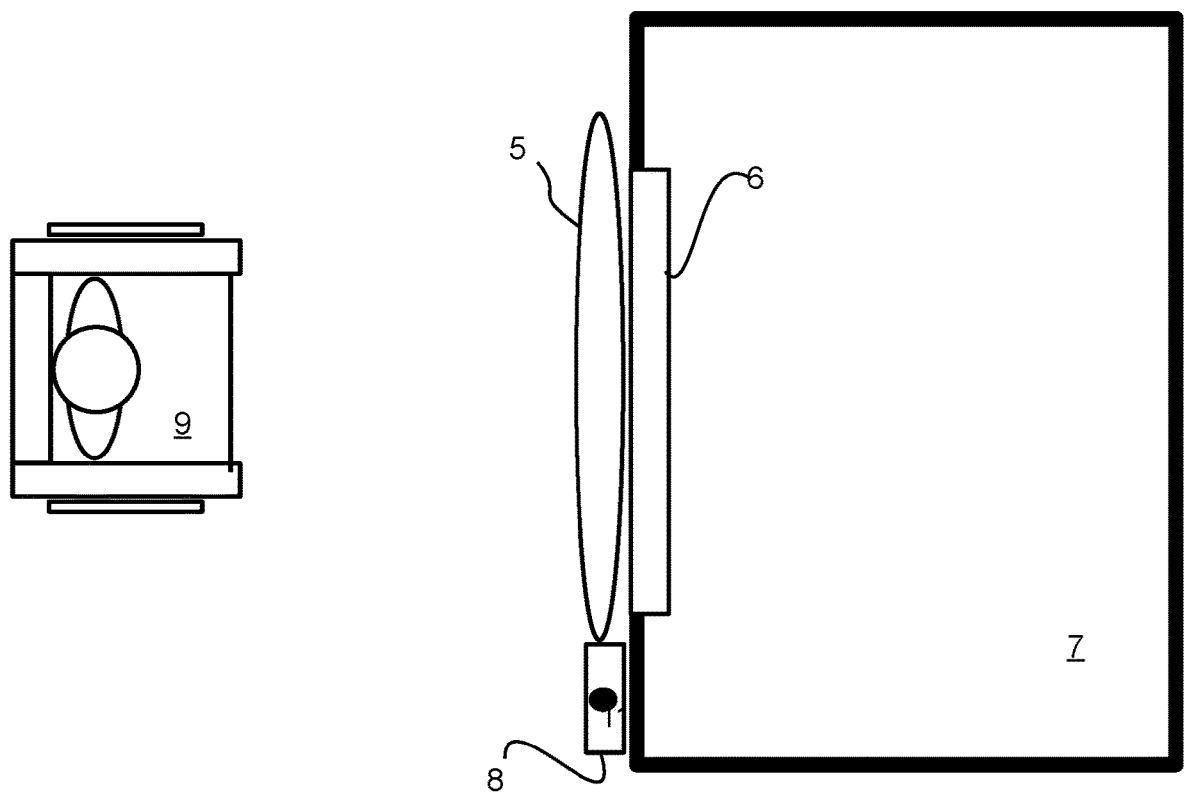

FIG. 2 shows the minimum system of one DESAC Sensor-Transmitter Module 8 watching a doorway 6 and one DESAC Receiver-Caller Module 11 receiving signals from the DESAC Sensor Transmitter Module. Each individual DESAC Sensor-Transmitter Module is responsible for 'deciding' whether an alarm call is needed or not, and the criteria for each may be different depending upon the sensing and reporting requirements of specific approaches and applications.

If the mobility-impaired patient 9 attempts to enter the restroom area 7, he will pass through the doorway-threshold area watched 5 by the Sensor-Transmitter Module sensing area. The Sensor-Transmitter Module begins a state test as detailed below. If the state test results in an Auto-Call, a radio signal is sent to the DESAC Receiver-AutoCaller 11 that an alarm call is to be sent out via the hospital's standard call-box 1. The Receiver-AutoCaller transmits the auto-call to the call-box via the standard ¼ inch jack cable 12 used with such systems.

It is possible to deploy the DESAC in an environment that does not also already have an in-house Call System. This would, more than likely, be the case in a private residence, where a Receiver-AutoCaller would serve the function of receiving and reporting a call for assistance. It is possible to have a single DESAC Sensor-Transmitter Module report to one or many DESAC Receiver-Caller Modules with an alarm box at each one in many different areas of a house, ensuring that everyone would know that help was immediately needed.

Figure 3:
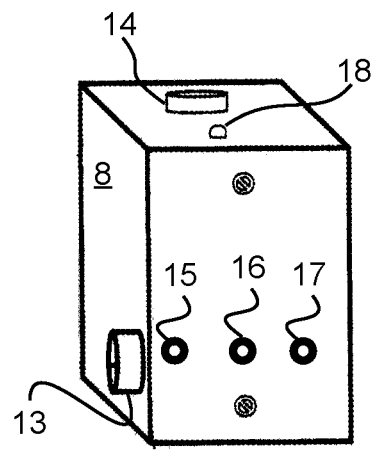
FIG. 3 shows the exterior of a standard embodiment of a DESAC Sensor-Transmitter Module.

FIG. 3 shows the exterior of a standard embodiment of a DESAC Sensor-Transmitter Module 8. A doorway-threshold discriminant radiative sensor vision device 13 projects from one side of the casing. A reset button 14 is shown projecting from the top of the casing, or any other exterior surface. Indicator lights are shown for BLOCKED 15, AUTO-CALL 16, BATTERY LOW 17 and OPERATION NORMAL 18. In the preferred embodiment, lights are LEDs in yellow for BLOCKED 15, red for AUTO-CALL 16, amber for BATTERY LOW 17 and green for OPERATION NORMAL 18.

Figure 4:
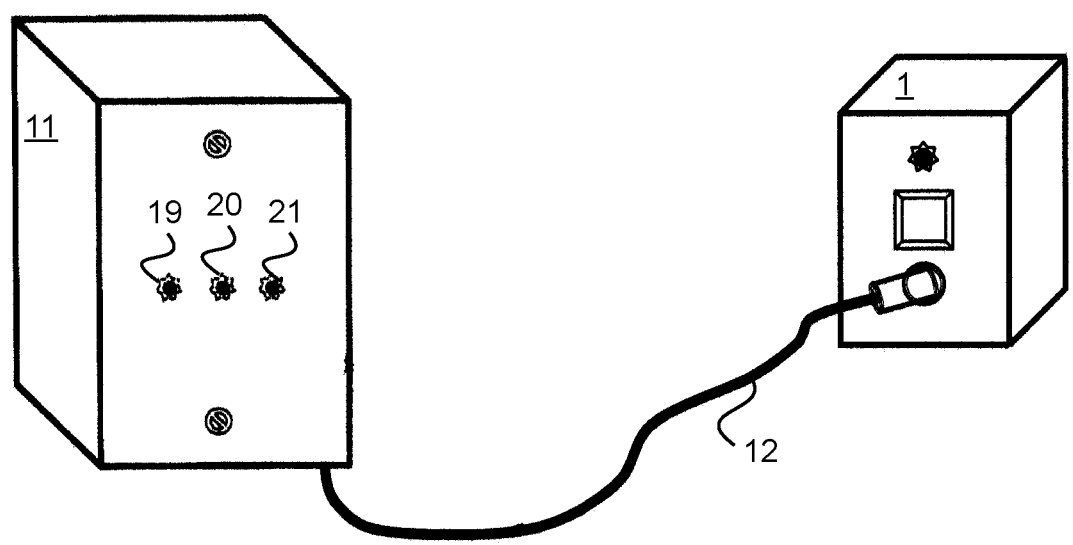
FIG. 4 shows the exterior of a standard embodiment of a DESAC Receiver-AutoCaller Module.

FIG. 4 shows the exterior of a standard embodiment of a DESAC Receiver-AutoCaller Module 11. An internal radio module receives signals from the Sensor-Transmitter Module, and alarm calls are transmitted from the Receiver-AutoCaller Module 11 to a standard call-box 1 via Indicator lights are shown for AUTO-CALL 19, BATTERY LOW 20 and OPERATION NORMAL 21.

The casing for the Receiver-AutoCaller can be a plastic box with custom cover of sufficient size to house the interior components, but a custom casing is expensive to manufacture until extremely large production volumes are reached. The casing should be plastic, to enable radio link communications, and to enable proper cleaning. A wall or surface-mount box (opposed to in-wall installation) is required for proper forward-placement to enable proper radio signal receptions. A metal casing would interfere radio reception.

In the preferred embodiment, single-gang width casings are used with standard plastic covers to reduce manufacturing cost. Also in the preferred embodiment, casing depth is less than that of the DESAC Sensor-Transmitter, because the Receiver-Autocaller does not require a D-Size battery inside and has no on-board tall-height device protrusions. Most minimum depth COTs plastic boxes will work. In the preferred embodiment, the Receiver-Autocaller casing is no larger than 3" by 5" by 2.5".

Figure 5:
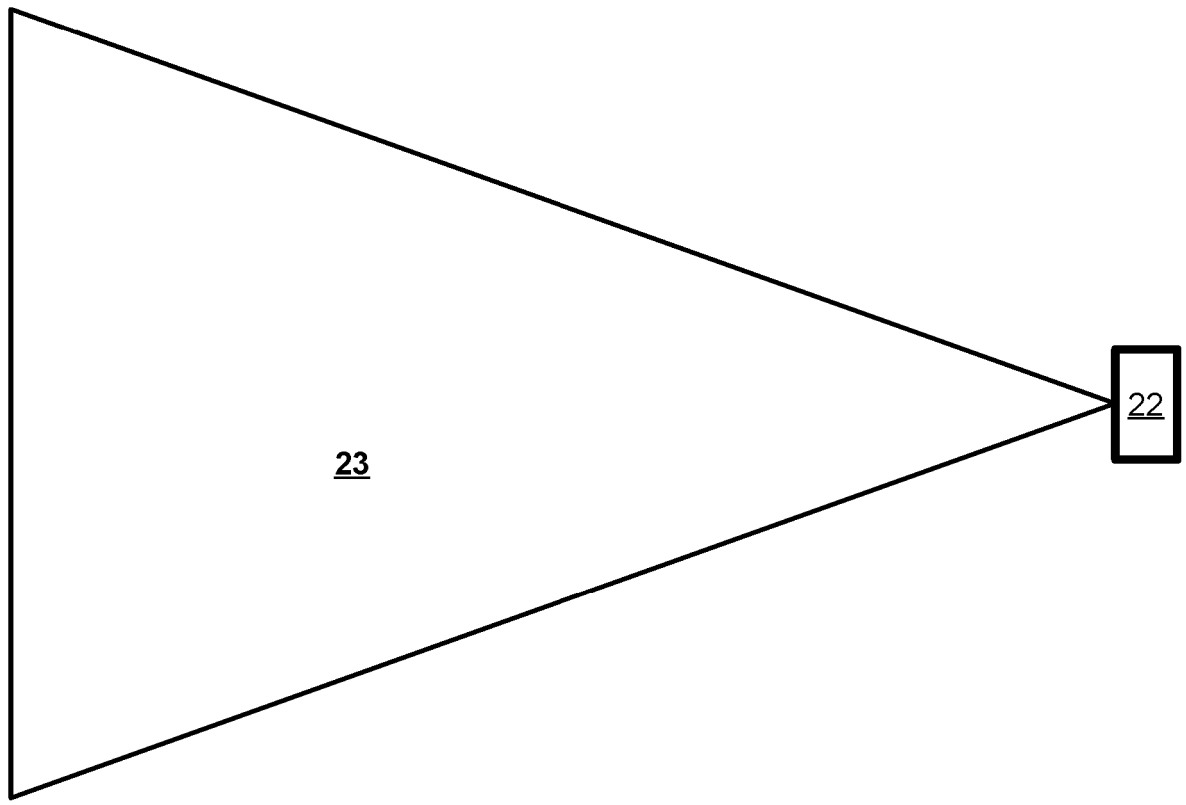
FIG. 5 (PRIOR ART) illustrates the range of vision in a typical infrared monitoring system.

FIG. 5 (PRIOR ART) illustrates the range of vision in a typical infrared monitoring system. An infrared projector/receiver 22 projects a cone of vision 23 that reflects from people outside the door threshold being watched, and even from the door itself, resulting in false positives.

The infrared detector has no distance or speed-of-motion discrimination capabilities, is drastically affected by changes in both ambient heat and light levels, and fails to detect "blockage" if there is no additional motion.

Figure 6:
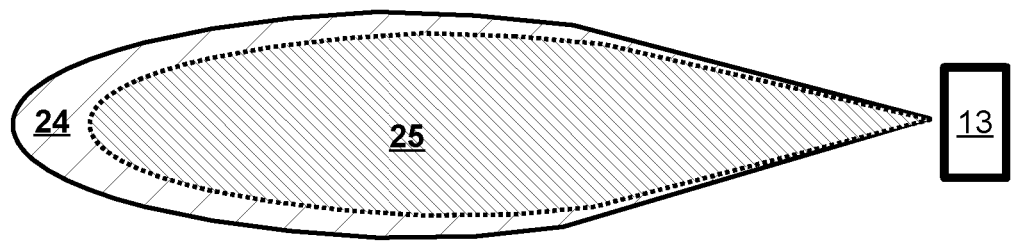
FIG. 6 illustrates the tunable narrow-beam range of detection used in the invention.

FIG. 6 illustrates the tunable narrow-beam range of detection used in the invention. An ultrasonic vision sensor 13 at full operating voltage projects a narrow beam 24 tunable to watch only a few inches wide in front in a door threshold. In the preferred embodiment of the invention, an Ultrasonic Range Transducer is a sender & receiver in one unit with narrow beam-forming architecture. This is preferable for rejection of side-objects and walls.

The vision sensor is used with a distance discriminator capable of being adjusted for determining both the minimum distance (how close is the object being detected) and the maximum distance (how far away is the object being detected) in the form of a variable width-and-placement window comparator for accurately defining a "blockage" as being detected, or not.

The vision sensor is also used with a motion speed discriminator, or duration tester, capable of determining how fast an object that qualifies as being a "blockage" is actually moving through the narrow Ultrasonic Beam, where moving quickly enough defines "too-short-duration" to be a patient, while not moving fast enough through the Ultrasonic Beam defines "Slow Motion Detected" warranting an alarm event.

Sense frequency can be controlled for reducing overall power. Watching once per second, for instance, is often enough to guarantee the detection of a blockage of interest while significantly reducing overall power requirements). The ultrasonic sensor can operate over a wide unregulated voltage range, compatible with the CMOS logic support circuits, reducing costs as no regulators are required. This factor maximizes battery-life operations, down to about +2.5 Vdc.

The ultrasonic sensor is not affected by abrupt changes in the ambient environment, loud noises, temperature changes, lights turning on and off, or radio signals. In one embodiment of the invention, the vision sensor 13 is tunable to max distances of 24 inches, 30 inches or 36 inches. In a second embodiment of the invention, the vision sensor is tunable to watch between a minimum distance of 6 inches and up to a tuned maximum distance of 60 inches at full battery power of 3.6 V. In the preferred embodiment of the invention, the Sensor-Transmitter circuitry includes field-selectable options for minimum distance, maximum distance, duration and speed of crossing.

The ultrasonic detection module is still operable at a minimum battery-low voltage of 2.5 V, producing a reduced but still working beam of detection 25. The MB1010 Ultrasonic Sensor is an example of a component capable of operating in the preferred embodiment of the invention.

Figure 7:
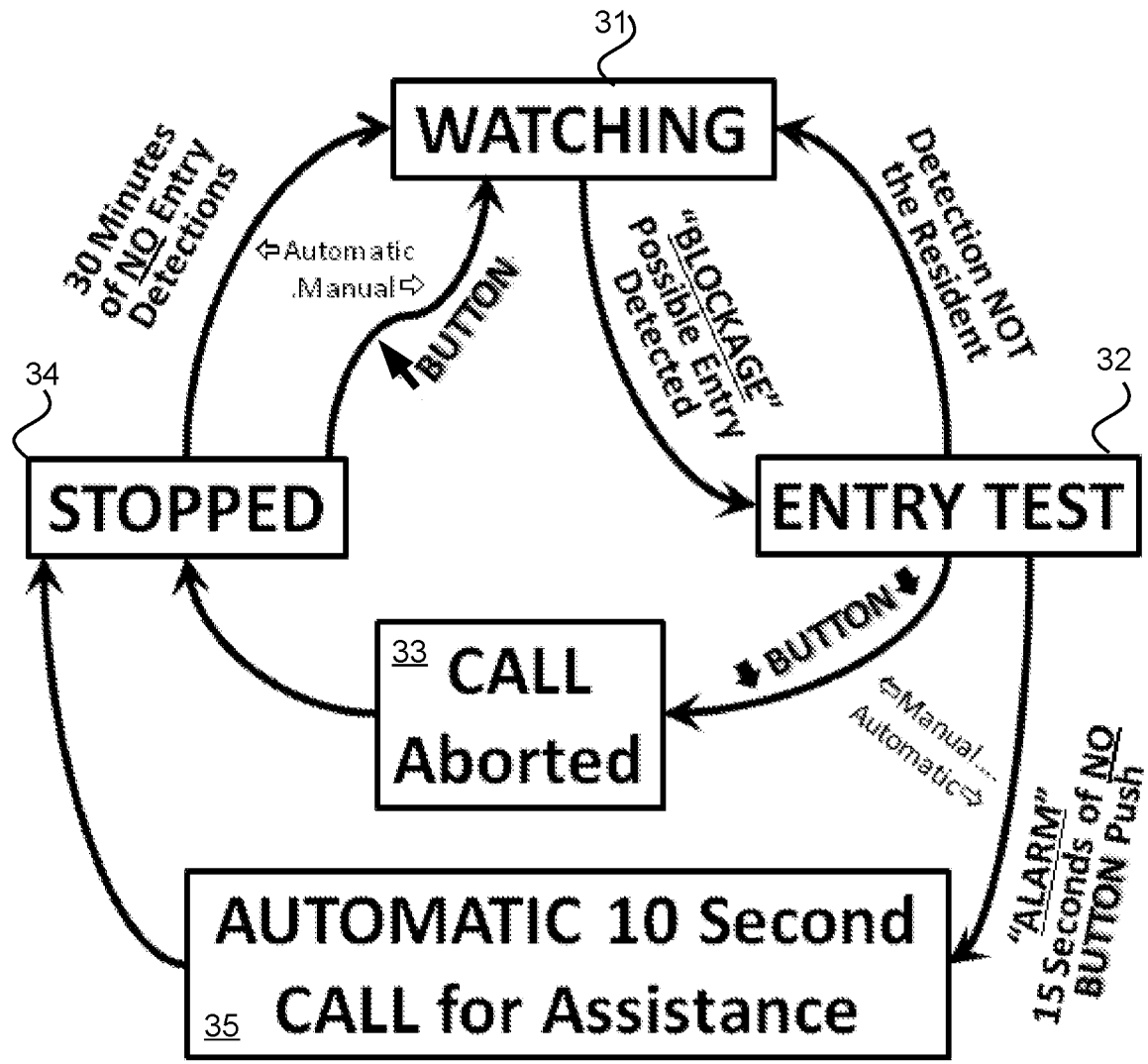
FIG. 7 is a state diagram illustrating the operating concept of the invention.

FIG. 7 is a state diagram illustrating the operating concept of the invention.

The Watching state 31 is the ever-vigilant state where the sensor is measuring distances to the nearest object in its very narrow beam of view. When the vision sensor detects an object blocking its view then it needs to be tested by moving to the Entry Test state 32.

In the Entry Test state 32, if the object is definitely blocking the region being watched then an automatic call for assistance may be warranted. A BLOCKED indicator starts turning blinking visually to alert staff or residents that they have been detected and that the reset button needs to be pushed within the Blocked Window to abort an automatic call from being made; otherwise, an automatic call for assistance will be made. Also, an Audio Alarm starts beeping audibly, alerting those in the area that they have been detected and that the Reset button needs to be pushed within the Blocked Window to abort an automatic call from being made.

In the preferred embodiment, the Blocked Window is a time period of fifteen seconds, but any period from five seconds to thirty seconds can reasonably be used. If the Reset button is pressed within this window, the Sensor-Transmitter is being told by staff or resident that an Auto-Call is not needed, and the Watching state 31 is returned to. Note further that a sensor vision blockage lasting less time than the Blocked Window is expected not to indicate a wheel-chair using patient, and thus the state also reverts to the Watching state 31.

From the Entry Test state 32, the Auto-Call Aborted state 33 is reached if the Reset button is pushed within the Blocked Window. The Auto-Call is aborted and the Sensor-Transmitter enters the Stopped State 34. If the Reset button is not pushed within the Blocked Window then the Autocall state 35 is entered to place an automatic Call for assistance, transmitted from the Sensor-Transmitter by radio to the Receiver-Autocaller for an Autocall duration—in the preferred embodiment, ten seconds duration—followed by entering the Stopped state 36.

There are two ways for the Sensor-Transmitter to restart watching again, thus entering the Watching state 31 from the Stopped state 34, and resuming watching for another possible entry into the region being monitored. A Manual move from the Stopped state back to the Watching state can be executed at any time by pushing the (now not blinking) red button on top of the DESAC box; or, an automatic move from the Stopped state back to the Watching state will be performed after a period of 30 (consecutive) minutes of no "blockages" being detected by the sensor.

The DESAC has been designed, therefore, to be able to work completely automatically to minimize the additional burden on the care staff (aids, nurses, and other attendants), most of whom seem to be already overloaded with tasks. The DESAC can also be controlled manually, if desired, by the care staff, in both preventing an automatic call being inserted into the facility's call system (when they are already present), and in restarting watching operations after deliberate movements in the region being watched are finished. This latter operation starts watching immediately, instead of waiting for 30 minutes for no entries in the automatic operations path. Again, the exact number of seconds for watching, restart, entry tests, auto-call and auto-call abort can vary.

Figure 8:
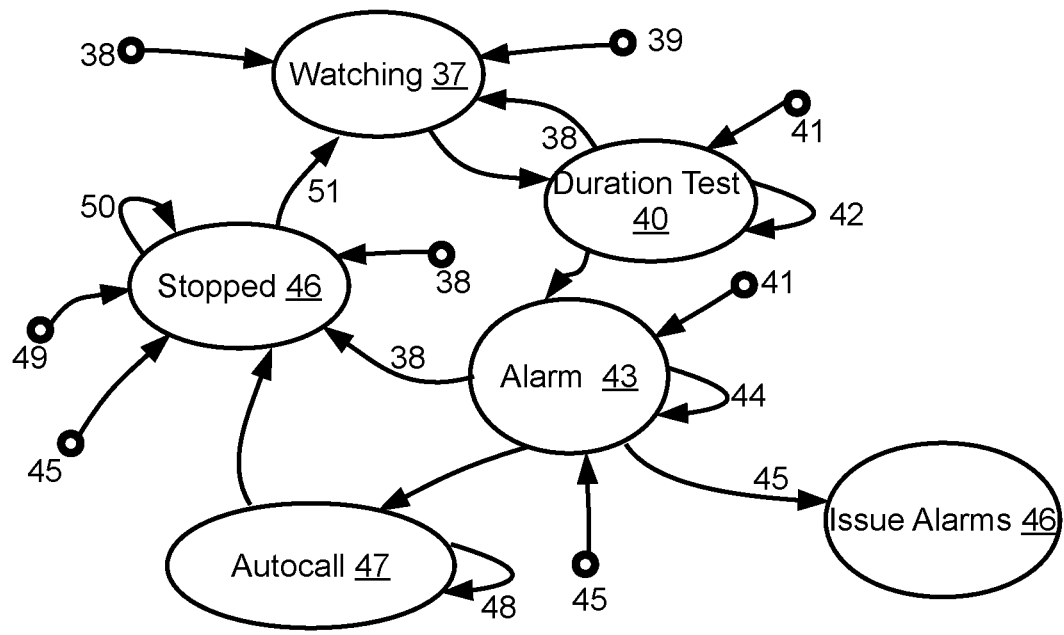
FIG. 8 is a more technical state diagram illustrating the operation of portions of the invention to perform the logical functions.

FIG. 8 is a more technical state diagram illustrating the operation of portions of the invention to perform the logical functions.

Here, the Watching 37 state is first entered from a power-on reset 38, powering up the Sensor-Transmitter via battery. The Sensor-Transmitter circuitry is watching for a blockage in its vision monitored area; a blockage is detected as sensor input 39 from the vision-sensor hardware. The input from the vision-sensor hardware includes distance discrimination; a blockage too near or too far is not entering the monitored doorway and is ignored.

If the blockage is not ignored, a Duration Test state 40 is entered. Clock input 41 acts as a second-timer for the Duration Test. A speed of motion discrimination 42 is performed to determine if threshold entry is caused by a wheelchair or walker, or if it is not, meaning normal walking speed motion. If slow motion is detected, the Alarm state 43 is entered.

In the Alarm state 43, clock input 41 again counts to the end of the Blockage Window, again usually 15 seconds. If the Blockage Window timer 44 is not done each second, the state remains in Alarm 43. Alarms are enabled 45, with Issue Alarms state 46 also entered contemporaneously— BlOCKED LED lighting blinks and any included audio alarm begins to beep. The Alarm state 43 is exited, to the Stopped state 46, via a hardware signal from a Reset button push 45. Or, The Alarm state 43 is exited, to the Autocall state 47 when the fifteen second Alarm timer has run out.

In the Autocall state 47, a call-for-assistance command is sent via wireless signal to the Receiver-Autocaller device for ten seconds, measured using a timer-not-done clocking function 48. When the timer is done, the auto-call-done condition sends the state diagram to the Stopped state 46.

In the Stopped state 46, a minute-timer 49 from the circuit clock holds in the Stopped state until a thirty-minute-timer 50 is done, or until a Reset button push 45 hardware signal is received. All exits from the Stopped state 46 perform a restart 51 of the Watching state 37. The thirty-minute-timer 49 can be reset by detection of another relevant blockage signal from sensor-vision hardware input 39.

Figure 9:
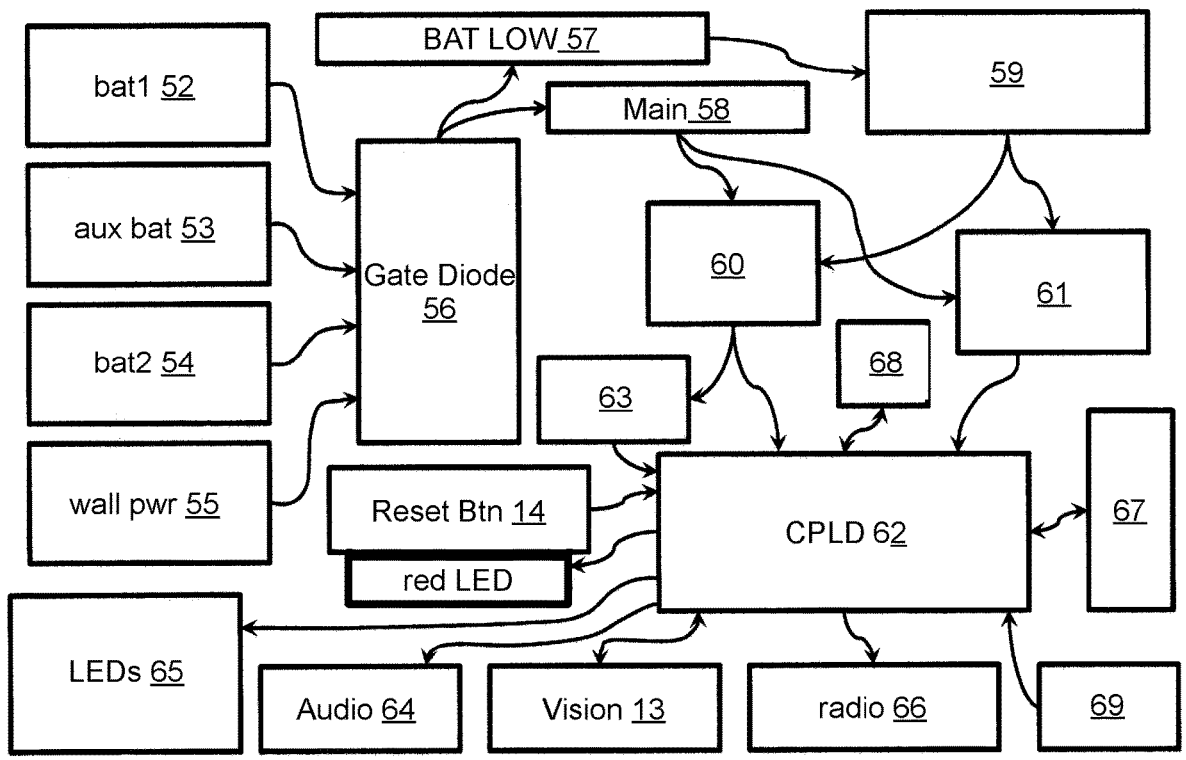
FIG. 9 is a circuit diagram of the Sensor-Transmitter module in a non-specialized embodiment of the invention.

FIG. 9 is a circuit diagram of the Sensor-Transmitter module in a non-specialized embodiment of the invention. This version uses deterministic clock-driven sequential state machines but requires two (+2.5 Vdc and +1.8 Vdc) LDO regulators for operations and uses slightly more power than simple CMOS SSI & MSI circuits.

Power is supplied by hot-swappable redundant batteries from a first lithium-ion cell in holder with built-in fuse 52, a first LiPo cell pack with built-in fuse 53, a second lithium-ion cell in holder with built-in fuse 54 and a wall-wart power interface with built-in fuse 55 for situation where wall power is available. Power sources feed into a low-loss Schottky diode power gate with second in-line fuse 56.

The power gate 56 feeds into a Battery Low detector 57 with BAT LOW red or amber LED, and into the main power switch 58. Battery Low detector feeds into a switch to enable automatic shutdown 59 if the battery is too low (usually under 2.5V). Main power switch 58 and shutdown switch 59 feed into a +2.5 Vdc I/O logic regulator 60 for sensors and radio signalling, and into a +1.8 Vdc core logic regulator 61. Both logic regulators feed into power to a CPLD sequential state machine 62.

A Power-On Reset 63 and a hardware Reset button 14 with debounce circuitry trigger the CPLD logic 62 and the red autocall Alarm LED built into the Reset button 14 is controlled by the logic 62. The logic circuit 62 also controls the beeping audio alarm 64 and the red AUTOCALL, yellow BLOCKED and green OERATING OK LEDs 65.

Most importantly, logic 62 controls the sensor-vision device 13, which is an ultrasonic range transducer. Logic 62 also controls the radio circuit module 66 used for communicating to the Receiver-Autocaller device. Logic 62 is accessed via an on-board configuration header 67 and test ports 68. Logic 62 uses a 27.1 khz oscillator 69 for clock speeds.

Figure 10:
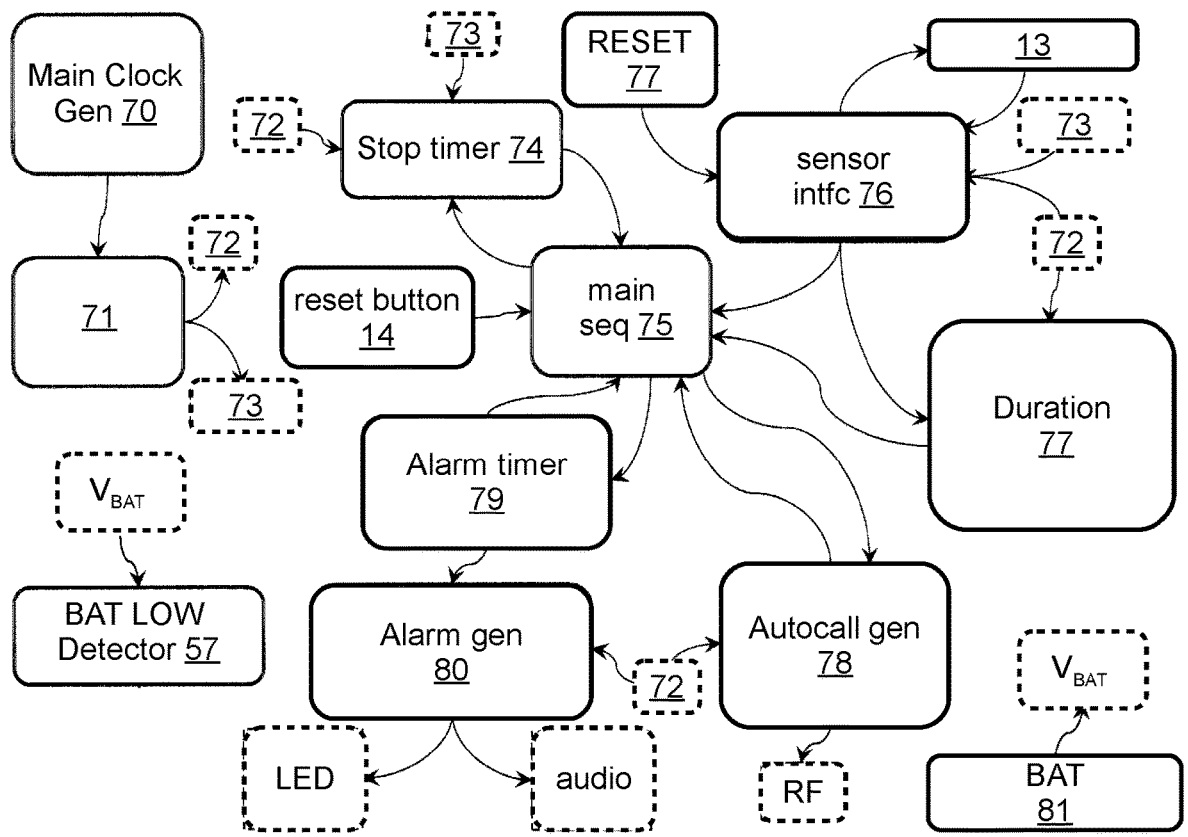
FIG. 10 is a circuit diagram of the Sensor-Transmitter module in the preferred embodiment of the invention.

FIG. 10 is a circuit diagram of the Sensor-Transmitter module in the preferred embodiment of the invention. In this diagram, the circuit of FIG. 9 is built upon and more specific component capacities are specified.

Starting from the upper left, a Main Clock Generator 70 is 14-bit counter based using an 8.192 kHz RC clock. The Main Clock Generator feeds into a set of DFF-based Pulse & 1 Hz Clock Generators 71 generating the 1 Hz signal 72 and PulseClk signal 73.

The PulseClk 73 signal feeds into a 12-bit counter based 30-minute Stopped-State Timer 74 with bidirectional feed to the System States DFF-based main sequencer 75. The Pulse-Clk 73 signal also feeds into a DFF and monostable multivibrator based variable-range sensor interface 76. The sensor interface receives sensor-vision feedback from the ultrasonic range sensor 13. The range sensor interface is also fed by a Reset generator 77.

The 1 Hz pulse 72 feeds the range sensor interface as well as a Duration Entry Test 78 that uses a decade counter plus DFF and monostable multivibrator. The range sensor interface and duration entry tester work together to alert the system states main sequencer to relevant threshold blockage. The Reset button 14 with debouncing circuitry cancels timers in the main sequencer.

The main sequencer fires both the decade-counter based Autocall Generator 78 and the Alarm Timer 79, which is decade-counter and DFF based. The Alarm Timer signals the Alarms Generator 80, which uses a charged pump and dual buffered, monostable multivibrator to fire a blinking LED and beeping audio alarm. The Autocall Generator fires the radio circuitry. The Alarms Generator and Autocall Generator run from the 1 Hz clock timer.

The set of hotswappable batteries 81 in holders with PTC resettable in-line fuse to limit current flow generate VBAT between 2.5 V and 3.6 V when fresh. The BAT LOW detector 57 uses a low duty cycle astable multivibrator and rests when receiving between 2.8 V and 3.6 V.

Figure 11:
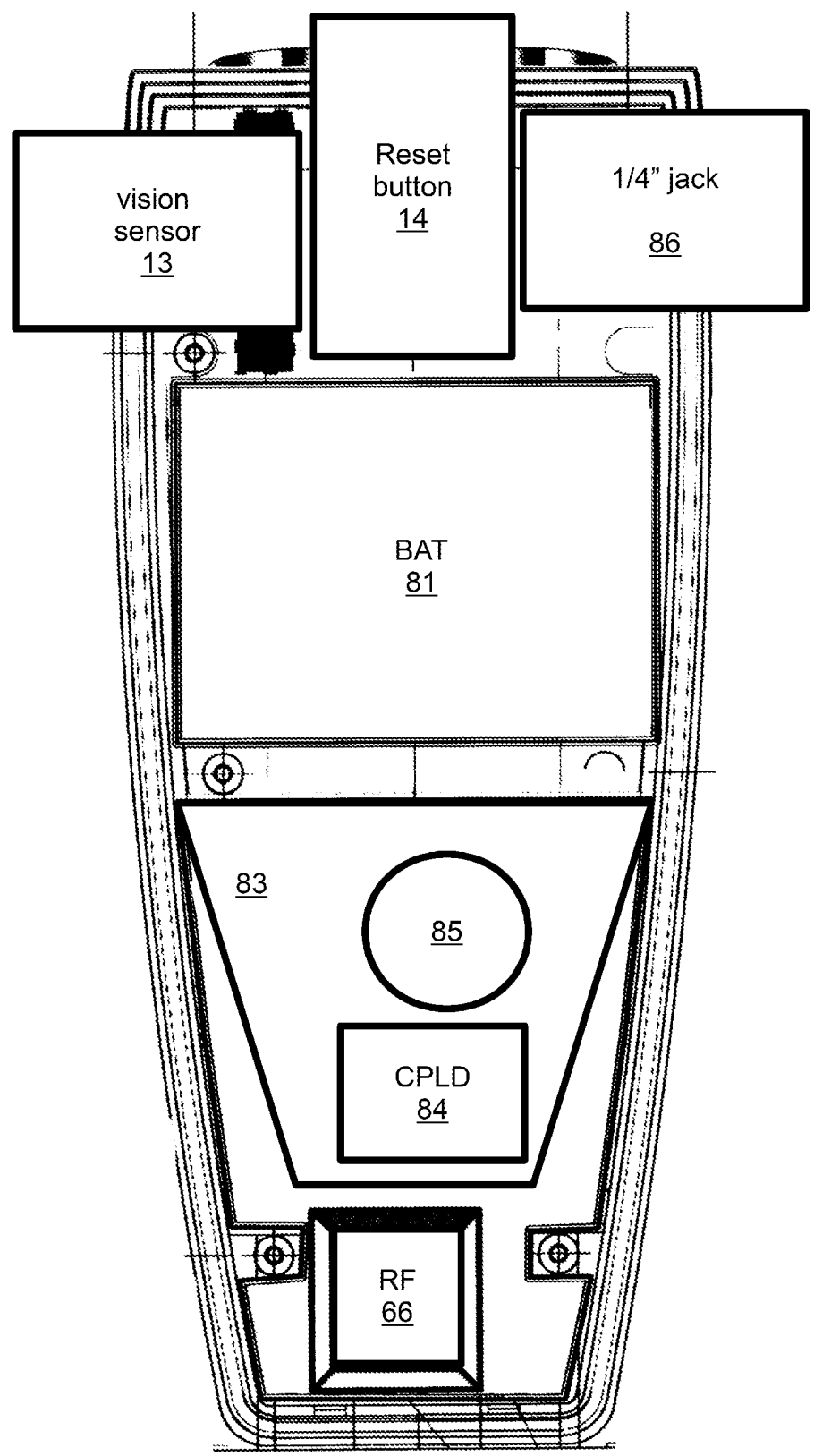
FIG. 11 is an embodiment of the Sensor-Transmitter module of the invention using a commercially available casing for nursing and hospital applications.

FIG. 11 is an embodiment of the Sensor-Transmitter module of the invention using a commercially available casing 82 for nursing and hospital applications. A foil-pack Lilo battery 81 occupies the middle of the casing with logic circuitry below. The narrow printed circuit board 83 necessitates four layers and accommodates a 256 mc CPLD 84. A section controlling LEDs and audio alarms 85 is also disposed on the circuit board.

The vision-sensor module 13 faces from one face of the casing and a ¼ inch jack 86 from the other side. The Reset button 14 takes a perpendicular facing from the vision-sensor 13. The radio module 66 takes up the narrow end of the casing 82.

Figure 12:
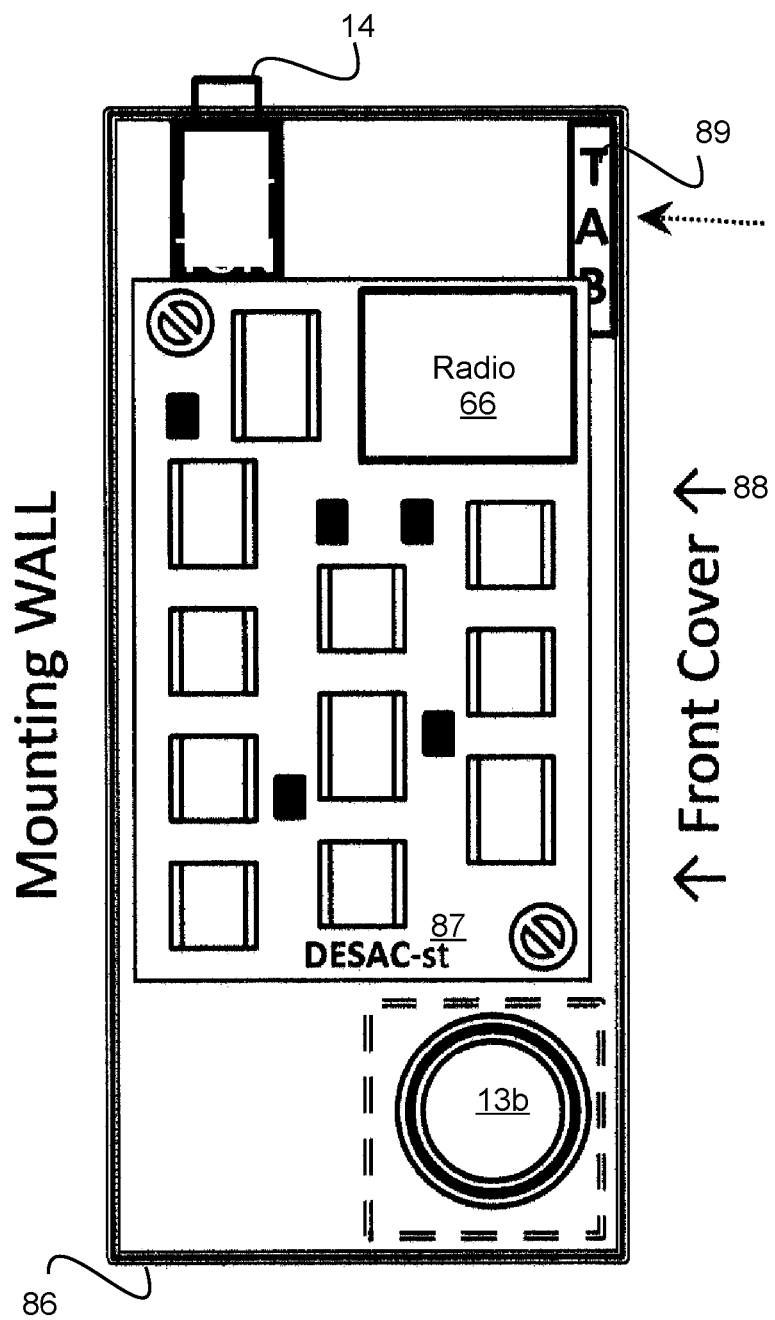
FIG. 12 is a side view of the interior of a Sensor-Transmitter circuit-fitted casing for the preferred embodiment of the invention.

FIG. 12 is a side view of the interior of a Sensor-Transmitter circuit-fitted casing 86 for the preferred embodiment of the invention. A sensor-vision module 13 extends through the side of the fitted casing 86 and communicates with the casing-side-fitted circuit board 87.

The side-face casing-fitted circuit board 87 is mounted to the interior side of the circuit-fitted casing and designed to fit the dimensions of the casing shown while also accommodating the Reset button 14, the side-mounted radio and the vision-sensor 13b in multiple facings. In some embodiments, the side-face casing-fitted circuit board 87 layout can be up to 4" by 3" for larger casings. In the preferred embodiment, the side-face casing-fitted circuit board 87 layout is compact at 2.77" by 1.8".

In this example, a left-facing vision-sensor 13b is illustrated. Wall mounting is provided by rear screws (not shown) and the front cover 88 is held and accessed by an upper mounting tab 89.

Figure 13:
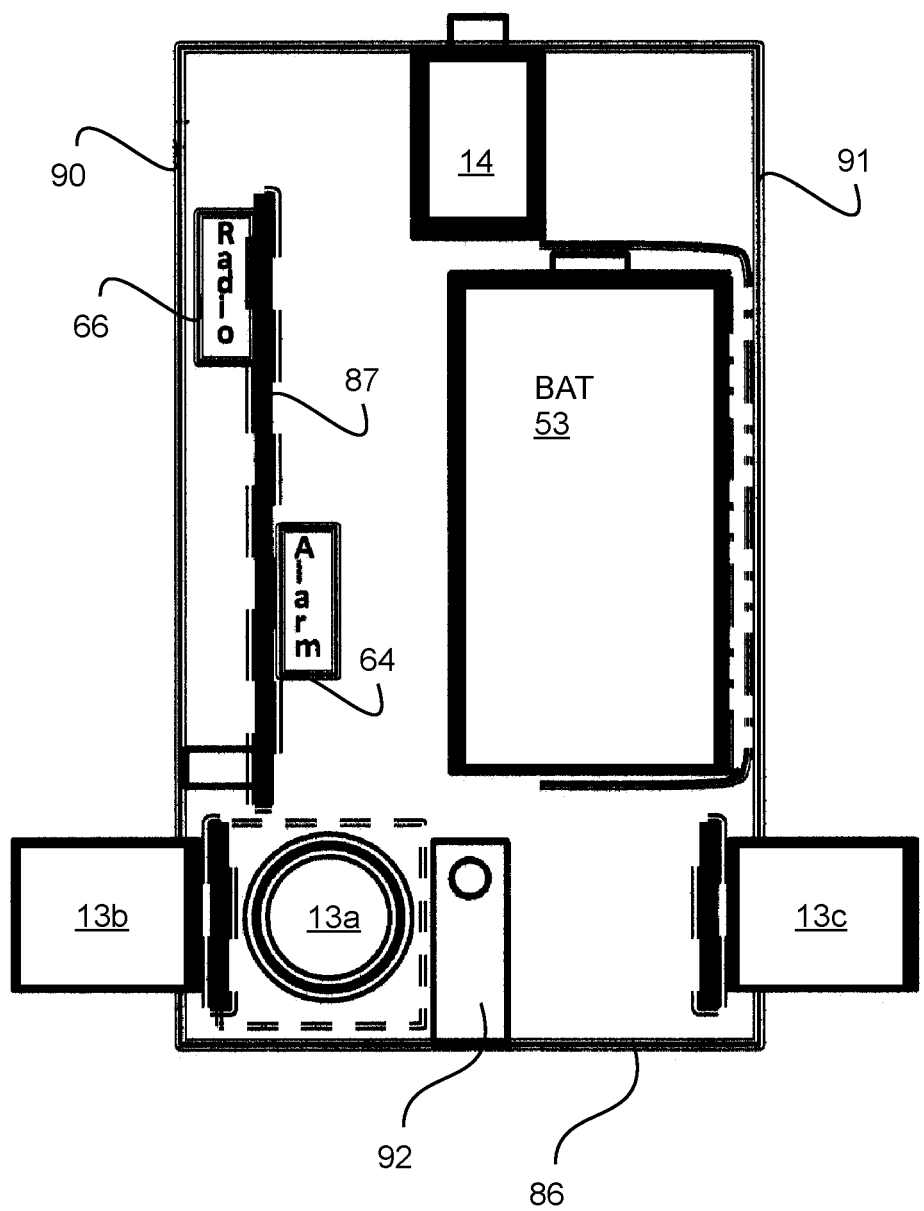
FIG. 13 is a front view to the interior of the Sensor-Transmitter circuit-fitted casing of FIG. 12 for the preferred embodiment of the invention.

FIG. 13 is a front view to the interior of the Sensor-Transmitter circuit-fitted casing 86 of FIG. 12 for the preferred embodiment of the invention. The casing-side-fitted circuit board 87 in this illustration is affixed to the left wall 90 of the casing with audio alarm 64 and radio module 66 placed nearest the casing for minimal interference.

The reset button 14 extruded through the top facing of the casing and the battery power source affixed to the interior of the right face 91 of the casing. A lower mounting tab 92 for the casing cover is also shown. A D-Size 19,000 mAhr 3.6 V Lithium Thionyl Chloride (Li-SOCl2) Cell is the preferred auxiliary Battery 53 for long service.

A front facing sensor-vision module 13a, left facing sensor-vision module 13b, and right facing sensor-vision module 13c shown possible manufactures for directional installations with this pairing of fitted-circuit 87 layout and fitted casing 86. Note that only one sensor-vision module is used per Sensor-Transmitter box, and three sensor-vision modules shown here are for the purpose of illustrating flexible configurations.

Figure 14:
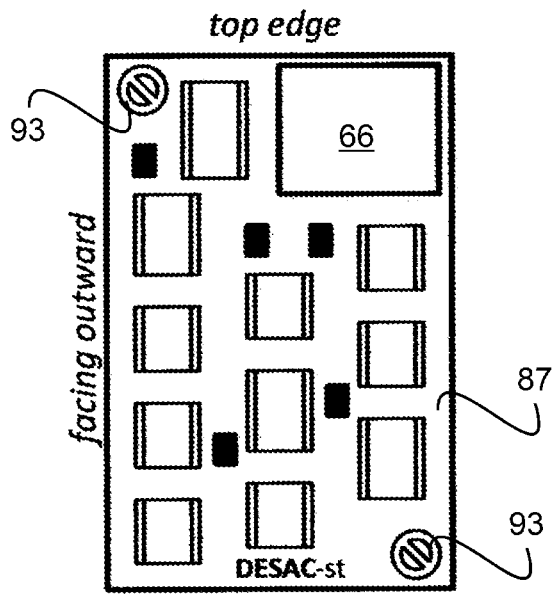
FIG. 14 is a top or outward-facing view of the side-face circuit layout of the Sensor-Transmitter module in the preferred embodiment of the invention.

FIG. 14 is a top or outward-facing view of the side-face circuit layout 87 of the Sensor-Transmitter module in the preferred embodiment of the invention. The radio module 66 is disposed on the upper portion of the circuit board, facing outward and thus just beneath the surface of the fitted casing. Corner-disposed screws or standoffs 93 attach the side-face circuit board 87 to the interior of a fitted-casing side face.

Figure 15:
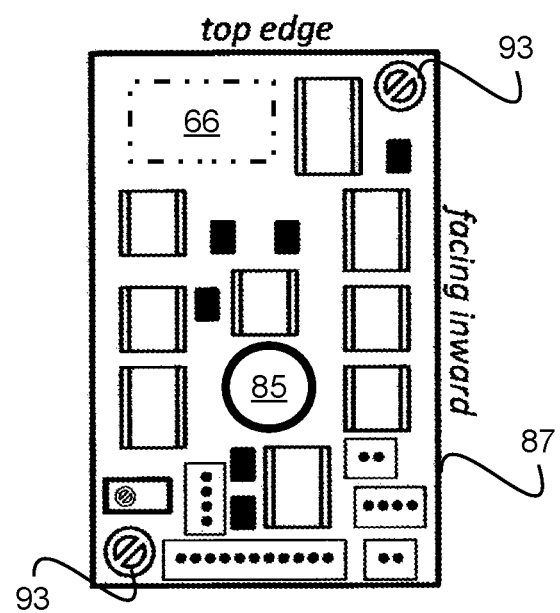
FIG. 15 is a reverse or inward-facing view of the side-face circuit layout of the Sensor-Transmitter module in the preferred embodiment of the invention.

FIG. 15 is a reverse or inward-facing view of the side-face casing-fitted circuit board 87 layout of the Sensor-Transmitter module in the preferred embodiment of the invention. A dashed-outline box shows the location of the radio module 66 is disposed on the opposite face of the circuit board, facing outward and thus just beneath the surface of the fitted casing. The audio alarm module 85 is disposed on the inward-facing side of the board 87. Corner-disposed screws or standoffs 93 attach the side-face circuit board 87 to the interior of a fitted-casing side face.

Figure 16:
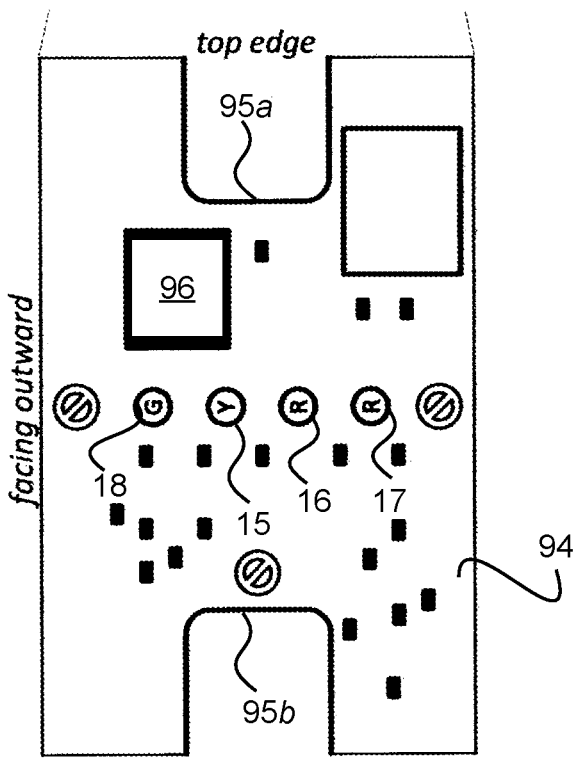
FIG. 16 is a top or outward-facing view of the H-shaped front-face circuit layout of the Sensor-Transmitter module in the preferred embodiment of the invention.

FIG. 16 is a top or outward-facing view of the H-shaped front-face casing-fitted circuit board 94 layout of the Sensor-Transmitter module in the preferred embodiment of the invention. Cutouts at top 95a and bottom 95b allow space for front cover mounting tabs. In some embodiments, the H-shaped front-face casing-fitted circuit board 94 can be up to 5" by 4" for larger casings. In the preferred embodiment, the H-shaped front-face casing-fitted circuit board 94 is compact at 4" by 2.5".

The forward face of the circuit allows room for logic 96 circuit. Because the preferred embodiment of the Sensor-Transmitter uses a no-software, all hardware design, the logic circuit is able to use fixed CMOS LSI plus MSI circuits, for reduced voltage and current requirements, reduced size and reduced cost. In this embodiment, all circuit components are operable to as low as 2.5 V low battery power, and up to 4.5 V hot. In the preferred embodiment, 4000-series and 4500-series Metal Oxide CMOS SSI and MSI components (or better) are used for lowest possible power usage. Best case current draw is thus 2.28 mA for the Watching state, 15.2 mA for the Blocked state and 15.6 mA for radio-sending an Autocall. However, acceptable battery times can be achieved with current draws of 4 mA for the Watching state, 20 mA for the Blocked state and 24 mA for radio-sending an Autocall.

LEDs indicating BLOCKED 15, AUTO-CALL 16, BATTERY LOW 17 and OPERATION NORMAL 18 are also indicated. BAT LOW 17 indicates at 2.7 V or less.

Figure 17:
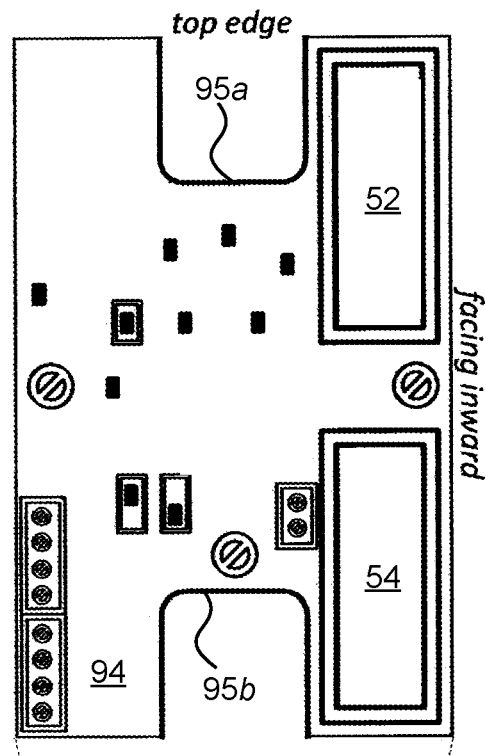
FIG. 17 is a reverse or inward-facing view of the H-shaped front-face circuit layout of the Sensor-Transmitter module in the preferred embodiment of the invention.

FIG. 17 is a reverse or inward-facing view of the H-shaped front-face circuit 94 layout of the Sensor-Transmitter module in the preferred embodiment of the invention. Cutouts at top 95a and bottom 95b allow space for front cover mounting tabs. The H-shape allows vertical space for hot-swappable batteries 52 and 54 to the side of the cut-outs. In the preferred embodiment, these hot-swappable batteries are high-capacity cells such as the 700 mAh CR123 cells or RCR123 cells.

Figure 18:
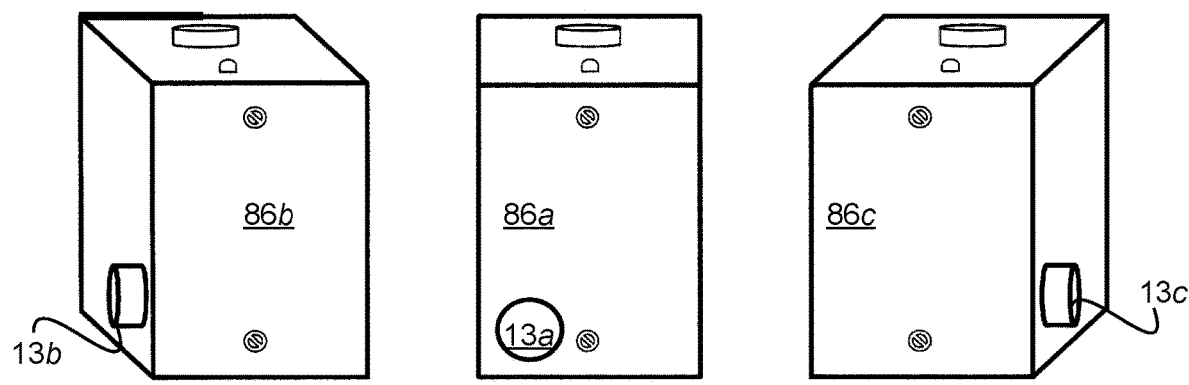
FIG. 18 shows three Sensor-Transmitters using three configurations of circuit-fitted casings.

FIG. 18 shows three Sensor-Transmitters using three configurations of circuit-fitted casings. A forward-configured circuit-fitted casing 86a has an opening allowing use of a forward-facing sensor-vision device 13a. A leftward-configured circuit-fitted casing 86b has an opening allowing use of a leftward-facing sensor-vision device 13b. A rightward-configured circuit-fitted casing 86c has an opening allowing use of a forward-facing sensor-vision device 13c.

Figure 19:
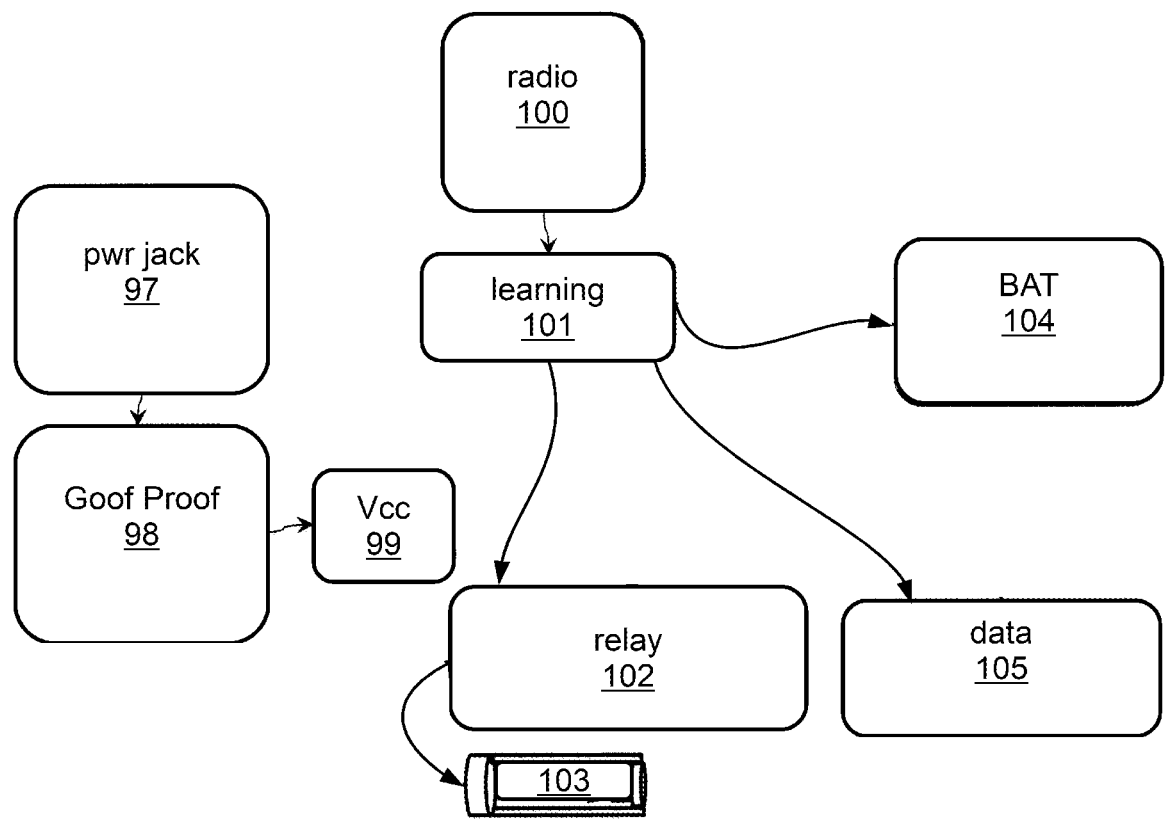
FIG. 19 is a circuit diagram for the Receiver-Autocaller module in the preferred embodiment of the invention.

FIG. 19 is a circuit diagram for the Receiver-Autocaller module in the preferred embodiment of the invention. Components are mounted on both sides of the printed circuit board to minimize the total square-inch-area of the board for minimum material costs.

Starting from the upper left, a bulkhead jack or cable-tethered USB power cable connector 97 plugs into any USB power source and can be fed by a USB wall-wart AC-DC power supply or any other +5 Vdc power source. Lowest level (100 mA) USB Power supply will also work since the DESAC Receiver-Autocaller requires far less current than this to operate.

The bulkhead jack provides power through a "Goof-Proof Any-Polarity" input protected 5 Vdc diode steering circuit 98 with integrated PTC fusing and that prevents circuit damage from cheap or defective power sources with reversed polarity. A +2.5 Vdc LDO regulator 99 then provides power to all other circuits.

A radio module 100 radio receives signals on matched frequencies from DESAC Sensor-Transmitter modules. In the preferred embodiment, this is a 2.4 Ghz ISM with wire-jumper-style mode select "switch" to select appropriate reception modes. It is WiFi interference tolerant. It is 2.4 GHz noise and interference tolerant. It is motor noise tolerant. It has 16-bit or better CRC data accuracy verification. Finally, in the preferred embodiment, the radio module has sufficient minimum range minimum of 100 feet, with ranges up to 500 feet possible. The RFD21733 2.4 GHz UHF radio module is an example of a component usable in the preferred embodiment.

Network Learning Circuitry 101 is configured to reject received radio signals unless they are from specific, matched DESAC Sensor-Transmitter modules. Integrated push-button "LEARN" logic for pairs the Receiver-Autocaller with DESAC Sensor-Transmitter(s). Causing an Autocall event from a Sensor-Transmitter while holding down an internal or external Learn button on the Autocaller-Receiver causes the Network Learning Circuitry 101 to learn the 32-bit serial number of the Sensor-Transmitter radio module and reject radio communications from other radio modules.

Radio auto-call signals from properly matched Sensor-Transmitter modules can then be put through a power-matched relay 102 to a ¼ inch jack or plug 103 for connecting to the facility call-box. The power-matched relay is, in the preferred embodiment, a logic-driven opto-isolated solid state relay. The power-matched relay 102 includes Form A, terminal block and ESD protection circuits.

Optional battery backup interface circuitry 104 includes a voltage detector, is monostable multivibrator based and feeds a battery low buffered red or amber LED. In the preferred embodiment, an on-board socket for a single CR123 cell works as short-term backup. The radio in receive mode draws a constant 17 mA of current, draining large capacity cells of this type in a little over 1000 hours.

Also optional are a data logging interface circuit 105 including DAS driver, connector and holder for connecting an external USB data drive.

One embodiment of the Receiver-Autocaller module of the invention uses a standard mechanical relay. However, the mechanical relay requires a relatively high operating voltage and current source, and requires snubbing circuits to properly handle the collapsing field of the electromagnetic coil.

Thus, in the preferred embodiment, where the Receiver-Autocaller may be expected to run under varied conditions including battery backup power, a Form-A optically isolated, logic drive, low voltage Solid State Relay is used that can effectively place an Autocall at a using only +2.5 Vdc. Similarly, in the preferred embodiment, minimal support circuits for conditioning power for the radio and the call-placing relay also draw minimal current and work at +2.5 Vdc.

The DESAC Receiver-Autocaller exterior view depicts up to four LEDs on the front cover, where 1 will always be installed, and optionally 2 or 3 more.

Figure 20:
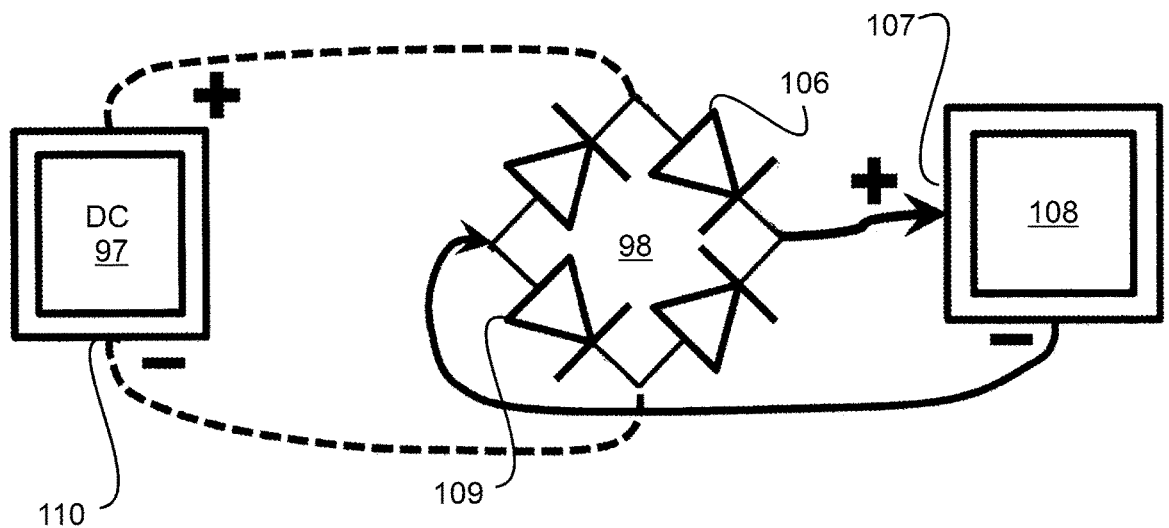
FIG. 20 is a simplified circuit diagram illustrating the goof-proof polarity correction circuit used in the preferred embodiment of the DESAC Receiver-Autocaller.

FIG. 20 is a simplified circuit diagram illustrating the goof-proof polarity correction circuit used in the preferred embodiment of the DESAC Receiver-Autocaller. Recognizing that wall-wart power converters for converting wall power to the 5 V DC used in the Receiver-Autocaller come from a variety of sources with varying levels of manufacturing quality, polarity correction is employed to protect polarity sensitive circuitry in the Receiver-Autocaller from wall-wart power supplies with incorrect polarity.

In this diagram, the DC voltage source 97 has the positive pole on top and negative pole on bottom. A full-wave bridge is used as a goof-proof DC steering circuit 98. Forward-biased diodes are conducting. The diode with a positive anode to cathode path 106 thus steers to the positive pole 107 of the polarity sensitive circuitry 108. The diode with a negative anode to cathode path 109 thus steers to the negative pole 110 of the DC voltage source.

Figure 21:
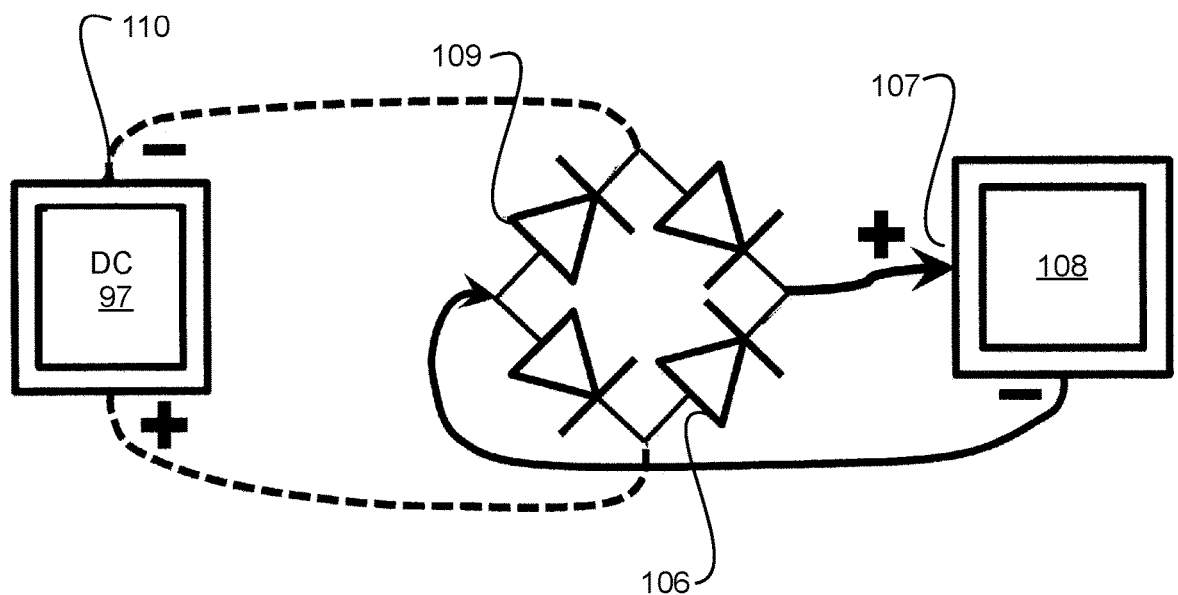
FIG. 21 is the reverse of the simplified circuit diagram of FIG. 20 illustrating the goof-proof polarity correction circuit used in the preferred embodiment of the DESAC Receiver-Autocaller.

FIG. 21 is the reverse of the simplified circuit diagram of FIG. 20 illustrating the goof-proof polarity correction circuit used in the preferred embodiment of the DESAC Receiver-Autocaller.

In this diagram, the DC voltage source 97 has the negative pole on top and positive pole on bottom. A full-wave bridge is used as a goof-proof DC steering circuit 98. Forward-biased diodes are conducting. The diode with a positive anode to cathode path 109 thus steers to the positive pole 107 of the polarity sensitive circuitry 108. The diode with a negative anode to cathode path 109 thus steers to the negative pole 110 of the DC voltage source.

Figure 22:
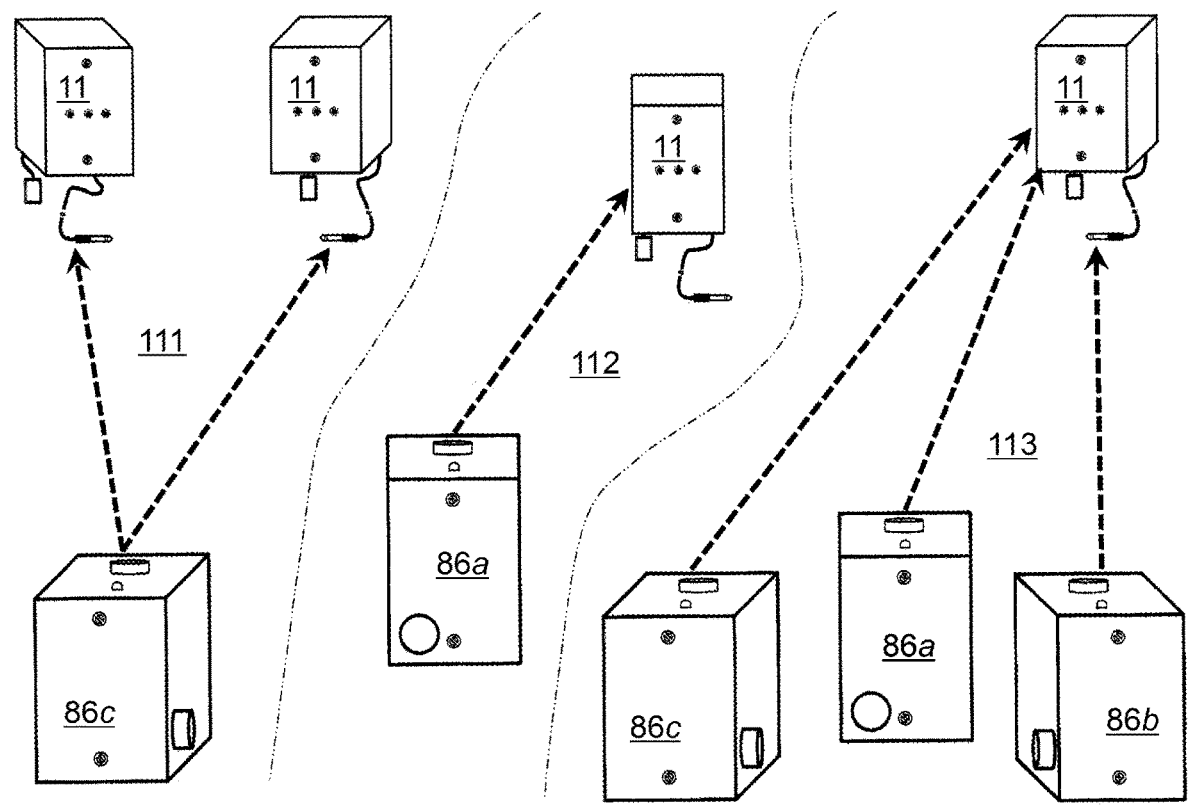
FIG. 22 portrays three different scenarios for deployment of DESAC Sensor-Transmitter and Receiver-Autocaller modules.

FIG. 22 portrays three different scenarios for deployment of DESAC Sensor-Transmitter and Receiver-Autocaller modules.

In a point-to-multipoint scenario 111, one Sensor-Transmitter module 86c can be radio-matched to two separate Receiver-Autocaller modules 11a and 11b. The point-to-multipoint arrangement 111 can be deployed where a facility-wide in-house call system is not available, such as in a private home. The Sensor-Transmitter module 86c will watch one door threshold, and alert a caregiver via blinking light or audio alarm on Receiver-Autocaller modules in two different rooms. Versions of the Receiver-Autocaller not meant to be connected to call boxes can have off or reset buttons.

The point-to-point scenario 112 is the typical deployment in which one Sensor-Transmitter module 86a is radio-matched to one Receiver-Autocaller module 11. The one Receiver-Autocaller module 11 is typically tied into a facility-wide in-house call system by a standard call-box connection.

The multipoint-to-point scenario 113 has three doors monitored by three Sensor-Transmitter modules 86a 86b 86c. All three Sensor-Transmitter modules are radio-matched to one Receiver-Autocaller module 11. The one Receiver-Autocaller module 11 is typically tied into a facility-wide in-house call system by a standard call-box connection.

Although the present invention has been described in connection with certain specific embodiments for instructional purposes, the present invention is not limited thereto. Accordingly, various modifications, adaptations, and combinations of various features of the described embodiments can be practiced without departing from the scope of the invention.

What is claimed is:

1. A system for alerting to patient emergencies, comprising:
    a stand-alone Sensor-Transmitter module, comprising:
        a Sensor-Transmitter casing with at least a first exterior face and a second exterior face;

a doorway-threshold discriminant radiative sensor;
a Sensor-Transmitter module-to-module communication radio;
an Area Blocked indicator, said Area Blocked indicator comprising a light, or an audio alarm, or both;
a Reset button;
a battery connector for a Sensor-Transmitter battery;
a Sensor-Transmitter control circuit;
at least one of: the doorway-threshold discriminant radiative sensor and the Sensor-Transmitter control circuit being operable using power from a Sensor-Transmitter battery;
the system for alerting to patient emergencies also comprising a stand-alone Receiver-AutoCaller module, the stand-alone Receiver-AutoCaller module comprising:
a Receiver-AutoCaller casing with at least a first exterior face and a second exterior face;
a Receiver-AutoCaller module-to-module communication radio;
an external power connector; and,
a Receiver-Autocaller control circuit.

2. The system of claim 1, further comprising:
A Receiver-AutoCaller call-box connector in the form of a quarter-inch jack; and,
a solid-state relay in a path between said Receiver-Autocaller control circuit and said Receiver-AutoCaller call-box connector; and
wherein the doorway-threshold discriminant radiative sensor is a device that emits energy and then senses blockages or reflections of that emitted energy.

3. The system of claim 1,
wherein the doorway-threshold discriminant radiative sensor has a narrow-beam forming architecture that causes the energy emitted by the doorway-threshold discriminant radiative sensor to avoid a wall when the Sensor-Transmitter Module is installed on said wall.

4. The system of claim 1, wherein the discriminant radiative sensor comprises an ultrasonic sensor.

5. The system of claim 1, wherein the discriminant radiative sensor comprises an ultrasonic sensor tunable to have a maximum range of less than 60 inches.

6. The system of claim 1, wherein said Sensor-Transmitter casing is a single-gang casing.

7. The system of claim 1, wherein the Sensor-Transmitter module comprises:
a casing-fitted circuit board having an H-shape with cut-outs for cover mounting tabs.

8. The system of claim 1, wherein said doorway-threshold discriminant radiative sensor is situated at said first exterior face of the casing or situated at said second exterior face of the casing; and,
wherein a sensor input from the doorway-threshold discriminant radiative sensor to the control circuit allows the control circuit to perform distance discrimination and duration discrimination of objects in a beam of energy emitted from the doorway-threshold discriminant radiative sensor.

9. The system of claim 1, wherein said Sensor-Transmitter casing comprises a third exterior face; and,
wherein said doorway-threshold discriminant radiative sensor is situated at said first exterior face of the casing or situated at said second exterior face of the casing or situated at said third exterior face of the casing; and,
wherein the doorway-threshold discriminant radiative sensor faces across a doorway threshold when installed and projects a narrow beam tuned to a path no more than twelve inches wide in front of the door threshold.

10. A system for alerting to patient emergencies, comprising:
a stand-alone Sensor-Transmitter module, comprising:
a Sensor-Transmitter casing with at least a first exterior face and a second exterior face;
a doorway-threshold discriminant radiative sensor;
a Sensor-Transmitter module-to-module communication radio;
an Area Blocked indicator, said Area Blocked indicator comprising a light, or an audio alarm, or both;
a Reset button;
a battery connector for a Sensor-Transmitter battery;
a Sensor-Transmitter control circuit;
at least one of: the doorway-threshold discriminant radiative sensor and the Sensor-Transmitter control circuit being operable using power from a Sensor-Transmitter battery; and,
a power reduction matrix, such that all electronic components of the Sensor-Transmitter module are operative at 2.5 volts or greater;
the system for alerting to patient emergencies also comprising a stand-alone Receiver-AutoCaller module, the stand-alone Receiver-AutoCaller module comprising:
a Receiver-AutoCaller casing with at least a first exterior face and a second exterior face;
a Receiver-AutoCaller module-to-module communication radio;
an external power connector; and,
a Receiver-Autocaller control circuit.

11. The system of claim 10, wherein the Sensor-Transmitter control circuit comprises fixed Complementary Metal-Oxide-Semiconductor logic operable at 2.5 volts or greater.

12. The system of claim 10, said Receiver-AutoCaller module further comprising radio pairing learning circuitry.

13. The system of claim 10, said Sensor-Transmitter module-to-module communication radio comprising a 2.4 Ghz UHF radio interference tolerant radio module.

14. The system of claim 10, said Receiver-Autocaller further comprising:
a goof-proof polarity protection circuit.

15. A system for alerting to patient emergencies, comprising:
a stand-alone Sensor-Transmitter module, comprising:
a Sensor-Transmitter casing with at least a first exterior face and a second exterior face;
a doorway-threshold discriminant radiative sensor;
a Sensor-Transmitter module-to-module communication radio;
an Area Blocked indicator, said Area Blocked indicator comprising a light, or an audio alarm, or both;
a Reset button;
a battery connector for a Sensor-Transmitter battery;
a Sensor-Transmitter control circuit;
at least one of: the doorway-threshold discriminant radiative sensor and the Sensor-Transmitter control circuit being operable using power from a Sensor-Transmitter battery; and,
a distance discrimination module, a duration discrimination module and a speed discrimination module;
the system for alerting to patient emergencies also comprising a stand-alone Receiver-AutoCaller module, the stand-alone Receiver-AutoCaller module comprising:
a Receiver-AutoCaller casing with at least a first exterior face and a second exterior face;
a Receiver-AutoCaller module-to-module communication radio;

an external power connector; and,
a Receiver-Autocaller control circuit.

* * * * *